United States Patent
Rachakonda et al.

(10) Patent No.: US 11,822,416 B2
(45) Date of Patent: *Nov. 21, 2023

(54) SYSTEM ON A CHIP THAT DRIVES DISPLAY WHEN CPUS ARE POWERED DOWN

(71) Applicant: Apple Inc., Cupertino, CA (US)

(72) Inventors: Ramana V. Rachakonda, Austin, TX (US); Rohit K. Gupta, Santa Clara, CA (US); Brad W. Simeral, San Francisco, CA (US); Peter F. Holland, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,976

(22) Filed: Sep. 23, 2022

(65) Prior Publication Data

US 2023/0082091 A1 Mar. 16, 2023

Related U.S. Application Data

(63) Continuation of application No. 17/015,288, filed on Sep. 9, 2020, now Pat. No. 11,500,448.

(51) Int. Cl.
*G06F 1/32* (2019.01)
*G06F 1/3287* (2019.01)
*G06F 1/3228* (2019.01)
*H04B 17/318* (2015.01)

(52) U.S. Cl.
CPC .......... *G06F 1/3287* (2013.01); *G06F 1/3228* (2013.01); *H04B 17/318* (2015.01)

(58) Field of Classification Search
CPC ........................................................ G06F 1/32
See application file for complete search history.

(56) References Cited

U.S. PATENT DOCUMENTS

| | | |
|---|---|---|
| 8,458,429 B2 | 6/2013 | Dahan et al. |
| 8,766,919 B1 | 7/2014 | Lachwani et al. |
| 8,862,906 B2 | 10/2014 | Jeganathan et al. |
| 9,323,307 B2 | 4/2016 | Haj-Yihia |
| 9,684,360 B2 | 6/2017 | Kupermann et al. |
| 11,500,448 B2 | 11/2022 | Rachakonda et al. |
| 2014/0002739 A1 | 1/2014 | Kwa et al. |
| 2014/0344608 A1 | 11/2014 | Wang |
| 2015/0187339 A1 | 7/2015 | Vaz Waddington |
| 2015/0352980 A1 | 12/2015 | Tripathi |

(Continued)

OTHER PUBLICATIONS

ISRWO, PCT/US2021/09213, dated Oct. 13, 2021, 12 pages.

*Primary Examiner* — Paul B Yanchus, III
(74) *Attorney, Agent, or Firm* — Kowert, Hood, Munyon, Rankin & Goetzel, P.C.

(57) ABSTRACT

In an embodiment, a system may include one or more processors forming central processing units (CPUs) in the system, a display controller configured to display frames on a display device, a memory controller configured to control a memory, and a power management circuit. The power management circuit may be configured to establish one of a plurality of power states in the system. In a first power state, the display controller and the memory controller are powered on while the CPUs are powered off. The display controller may be configured to read a plurality of prerendered frames from the memory and display the plurality of prerendered frames at times specified for each of the plurality of prerendered frames.

20 Claims, 9 Drawing Sheets

(56) References Cited

U.S. PATENT DOCUMENTS

| | | |
|---|---|---|
| 2016/0071485 A1 | 3/2016 | Tripathi et al. |
| 2017/0085253 A1 | 3/2017 | Cao et al. |
| 2017/0092236 A1 | 3/2017 | Tripathi et al. |
| 2017/0220131 A1 | 8/2017 | Huang et al. |
| 2018/0061355 A1 | 3/2018 | Zheng et al. |
| 2020/0081517 A1 | 3/2020 | Holland et al. |

SYSTEM ON A CHIP THAT DRIVES DISPLAY WHEN CPUS ARE POWERED DOWN

This application is a continuation of U.S. patent application Ser. No. 17/015,288, filed on Sep. 9, 2020 and now U.S. Pat. No. 11,500,448. The above application is incorporated herein by reference in its entirety.

BACKGROUND

Technical Field

Embodiments described herein are related to integrated circuits and, more particularly, to reduced power modes in integrated circuits.

Description of the Related Art

Mobile devices (e.g. cell phones, smart phones, tablet computers, laptops, wearable devices such as smart watches, etc.) are often operating on a limited power supply, such as a battery, as compared to an essentially unlimited power supply such as a wall plug. Users value mobile devices that operate for longer periods of time on a given amount of battery charge. Accordingly, mobile device designers focus on controlling the power consumption of circuitry in the mobile device while providing performance levels that are expected by the users.

Most mobile devices have a display, which is a significant part of the user's interaction with the device. Information is displayed by the device on the display screen, and many devices include touch screen functionality so that the user can provide input to the device via the display. Accordingly, the display is often on for long periods of time in a mobile device. The ability to control the display with low power consumption is therefore an important factor in the design of mobile devices.

SUMMARY

In an embodiment, a system may include one or more processors forming central processing units (CPUs) in the system, a display controller configured to display frames on a display device, a memory controller configured to control a memory, and a power management circuit. The power management circuit may be configured to establish one of a plurality of power states in the system. In a first power state, the display controller and the memory controller are powered on while the CPUs are powered off. The display controller may be configured to read a plurality of prerendered frames from the memory and display the plurality of prerendered frames at times specified for each of the plurality of prerendered frames. In an embodiment, the ability to operate with the CPUs powered off (and potentially other components of the system powered off) may lead to power consumption savings not possible in previous systems.

BRIEF DESCRIPTION OF THE DRAWINGS

The following detailed description makes reference to the accompanying drawings, which are now briefly described.

Figure 1:
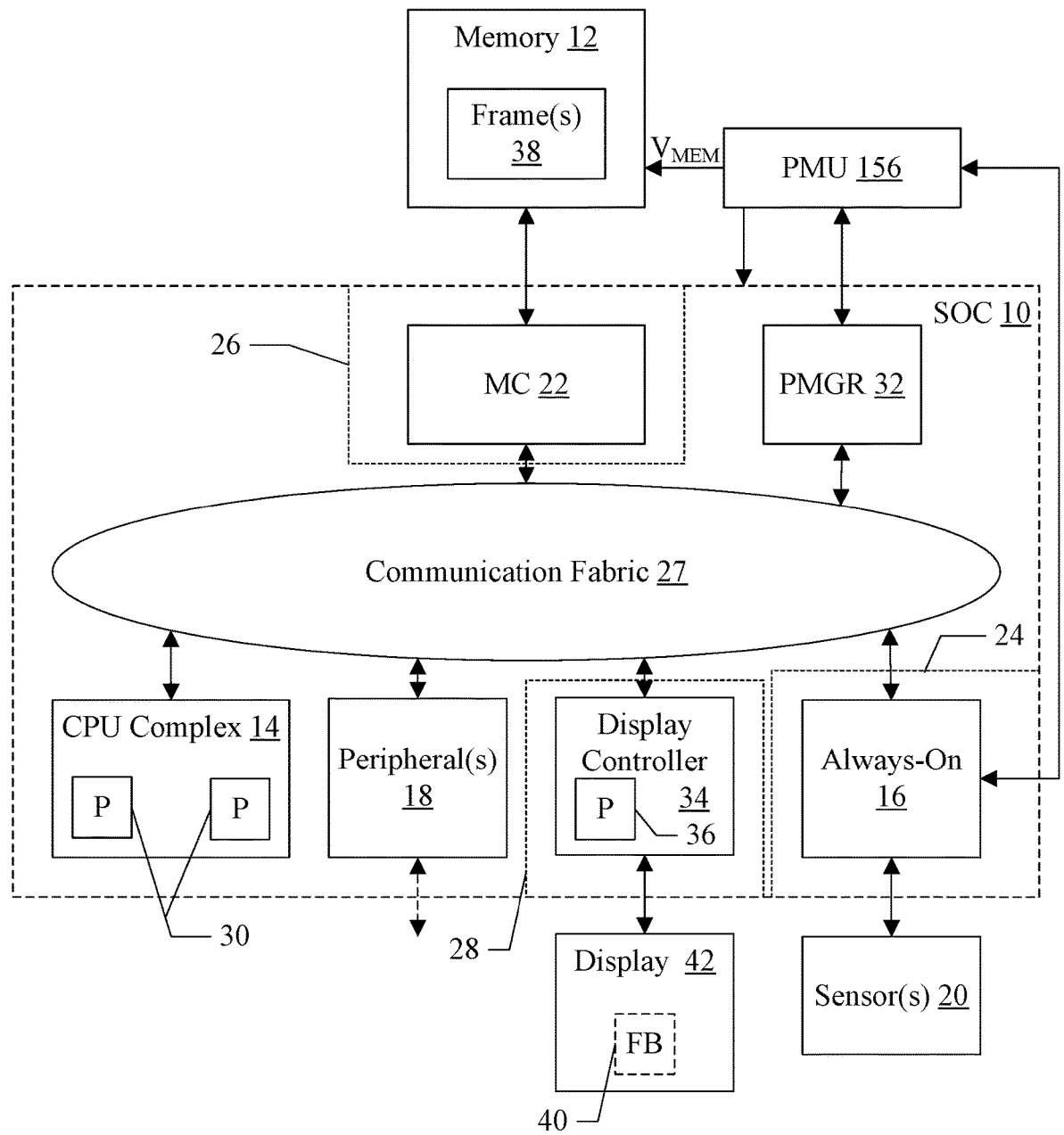
FIG. 1 is a block diagram of one embodiment of a portion of a system.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

Turning now to FIG. 1, a block diagram of one embodiment of an SOC 10 is shown coupled to a memory 12, at least one sensor 20, at least one display 42, and a power management unit (PMU) 156. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, an "always-on" component 16, one or more peripheral components 18 (more briefly, "peripherals"), a memory controller 22, a display controller 34, a power management circuit (PMGR) 32, and a communication fabric 27. The components 14, 16, 18, 22, 32 and 34 may all be coupled to the communication fabric 27. The memory controller 22 may be coupled to the memory 12 during use. The PMGR 32 and the always-on component 16 may be coupled to the PMU 156. The PMU 156 may be configured to supply various power supply voltage to the SOC, the memory 12, and/or the sensors 20. The always-on component 16 may be coupled to the sensors 20 during use. The display controller 34 may be coupled to the display 42 during use. In the illustrated embodiment, the CPU complex 14 may include one or more processors (P 30 in FIG. 1). The processors 30 may form the CPU(s) of the SOC 10. Additionally, in the illustrated embodiment, the display controller 34 may include one or more processors 36.

The always-on component 16 may be configured to remain powered up when other components of the SOC 10 (e.g. the CPU complex 14, the peripherals 18A-18B, and the PMGR 32) are powered down. More particularly, the always-on component 16 may be on whenever the SOC 10 is receiving power from the PMU 156. Thus, the always-on component is "always-on" in the sense that it may be powered if the SOC 10 is receiving any power (e.g. at times when the device including the SOC 10 is in standby mode or is operating actively), but may not be powered when the SOC 10 is not receiving any power (e.g. at times when the device is completely turned off). The always-on component 16 may support certain functions while the remainder of the SOC 10 is off, allowing low power operation.

In FIG. 1, a dotted line 24 separating the always-on component 16 from the other components may indicate an independent power domain for the always-on component 16. Similarly, in the illustrated embodiment, a dotted line 26 may represent an independent memory controller power domain for the memory controller 22. Still further, the dotted line 28 may represent another independent power domain for the display controller 34. Other components, groups of components, and/or subcomponents may have independent power domains as well. Generally, a power domain may be configured to receive supply voltage (i.e. be powered on) or not receive supply voltage (i.e. be powered off) independent of other power domains. In some embodiments, power domains may be supplied with different supply voltage magnitudes concurrently. The independence may be provided in a variety of fashions. For example, the independence may be provided by providing separate supply voltage inputs from the PMU 156, by providing power switches between the supply voltage inputs and components and controlling the power switches for a given domain as a unit, and/or a combination of the above. There may be more power domains than those illustrated in FIG. 1 as well. For example, the CPU complex 14 may have an independent power domain (and/or each CPU processor 30 may have an independent power domain as well) in an embodiment. One or more peripheral components 18 may be in one or more independent power domains in an embodiment.

The display controller 34 may be in an independent power domain 28 to permit the display controller 34 to be powered when other components are powered off. Thus, there may be a power state in the SOC 10 in which the display controller 34 is powered on and displaying frames on the display 42 while other components are powered down. In an embodiment, a plurality of prerendered frames 38 may be stored in the memory 12. The frames 38 may be rendered by one or more graphics processing units (GPUs) that may be included in the peripherals 18, for example. The CPUs 30 may also be configured to participate in the rendering of the frames 38. The frames 38 may be "prerendered" in the sense that the frames 38 are rendered in preparation for powering down the CPUs 30, the GPUs, and other components in the SOC 10 while keeping the display controller 34 and the memory controller 22 powered to permit the display controller 34 to read the frames 38 and display the frames on the display 42. The system may still be providing information for the user, while most of the system is powered down, conserving power while providing the desired functionality.

For example, if a user is watching a video playback, but not using other functionality in the system, portions of the video may be prerendered and placed in memory 12, and the system may be powered down while the frames are displayed. As the display controller nears the end of the prerendered frames, the system may be powered up again to render the next set of frames. Or, if the user interacts with the system (e.g. touches the screen or operates another input control), the system may power up to respond to the user's input. Other cases may include displaying the time or other information that is predictable (and thus may be prerendered).

A frame may refer to a single image to be displayed on the display at a certain point in time. The data representing the frame (e.g. pixel colors in red-green-blue (RGB) format or luminance-chrominance format (YUV), or any other representation) may be stored in memory 12 and read and processed by the display controller 34 to drive the display 42. A series of frames displayed at a designated frame rate (e.g. 30 frames per second, 60 frames per second, 120 frames per second, etc.) may form a video sequence.

The display controller 34 may include the processor 36, which may assist in performing various tasks that would typically be performed on a CPU (e.g., a portion or all of the driver for the display controller 34). Providing the processor 36 in the display controller 34 may expand the functionality that may be achieved while the CPUs 30 remain powered down. For example, the processor 36 may render a certain amount of dynamic content into the frames 38. The time could be composited into the prerendered frames for example. In a portable cellular device, the cellular signal strength indicator may be composited in. In a device using WiFi network access, the WiFi signal strength indicator may be composited in. In either case, the processor 36 may communicate with the corresponding subsystem to determine the strength, and may select a prerendered image that represents the strength to composite into the image. In other embodiments, changes in the ambient light around the device may result in changes to the prerendered frames, which may be handled by the processor 36. Additional details are provided further below.

The display 42 may be any sort of display device (e.g. liquid crystal displays (LCDs), light emitting diode displays (LEDs) such as organic LEDs (OLEDs), plasma displays, etc.). The display 42 may be integrated with touch sensing technology to serve as an input device as well. In some embodiments, the display 42 may include a frame buffer 40, which may include a memory to store a current frame being displayed. If the frame does not change for some period of time greater than the frame rate, the display controller 34 need not resend the frame to continue its display. Other embodiments may not include the frame buffer 40, and the display controller 34 may provide frames for display at a desired frame rate, even if the content is not changing.

As illustrated in FIG. 1, the always-on component 16 may be coupled to at least one sensor 20 (and may be coupled to multiple sensors 20). The always-on component 16 may be configured to read the sensor data from the sensors 20 while the SOC 10 is powered off (in addition to the times when the SOC 10 is powered on). The always-on component 16 may include a memory (not shown in FIG. 1) to buffer the sensor data, and the remainder of the SOC 10 need not be powered up unless the memory (or a portion thereof allocated to store sensor data) fills with data (or reaches a threshold level of fullness). In some embodiments, the always-on component 16 may be configured to process the sensor data in some fashion as well.

The sensors 20 may be any devices that are configured to detect or measure aspects of the physical environment of a device that includes the sensors. For example, a sensor may include an accelerometer which measures acceleration of the device. An accelerometer may be directional (measuring acceleration in a predetermined direction) or vector (measuring acceleration in multiple dimensions and producing a vector indicating the acceleration and its direction). Multiple directional accelerometers may be employed to permit vector acceleration sensing as well as directional acceleration sensing. Another example of a sensor may be gyroscope (or gyro). The gyroscope may be used to detect the orientation of the device and/or changes in orientation. Like the accelerometer, the gyroscope may be directional or multidimensional, and/or multiple directional gyroscopes may be used. Yet another sensor may be a magnetometer, which may be used to measure magnetic orientation and thus may be used to form a compass. In other embodiments, the compass functionality may be embedded in the sensor. Another sensor may be an audio detector (e.g. a microphone). The audio detector may capture sound and generate data indicative of the sound. Another sensor may be a photodetector that detects light or other electromagnetic energy (e.g. an ambient light sensor). Other exemplary sensors may include an altimeter to detect altitude, a temperature sensor, and/or a pressure sensor. Still another sensor may be a user interface device such as a button, a touch screen, a keyboard, a pointing device, a camera, etc. Any set of sensors may be employed.

As mentioned above, the always-on component 16 may be configured to buffer data in a memory within the component. If the buffer is nearing full, the always-on component 16 may be configured to wake the memory controller 22 in order to write the sensor data to the memory 12. In some embodiments, the always-on component 16 may be configured to write results of filtering the data to the memory 12. In some embodiments, the always-on component 16 may perform other processing tasks while the rest of the SOC 10 is powered down. To the extent that these tasks access the memory 12, the always-on component 16 may be configured to wake the memory controller 22. In addition, the always-on component 16 may be configured to wake at least a portion of the communication fabric 27 (i.e. the portion that connects the always-on component 16 to the memory controller 22).

Using this memory-only communication mode, the always-on component 16 may be able to access the memory 12 and take advantage of the significant storage available in the memory 12 while expending a relatively low amount of energy/power, since the remainder of the SOC 10 remains powered down. The always-on component 16 may store programmable configuration data for the memory controller 22, so that the always-on component 16 may program the memory controller 22 once power is restored. That is, the always-on component 16 may be configured to program the memory controller 22 in a manner similar to the way the operating system would program the memory controller 22 during boot of the device including the SOC 10. The programmable configuration data stored by the always-on component 16 may be the configuration data that was in the memory controller 22 when the SOC 10 (except for the always-on component 16) was most recently powered down, in one embodiment. In another embodiment, the programmable configuration data may be a configuration that is known to work for any previous configuration of the memory controller 22 and/or any configuration of the memory 12. The known-good configuration may, e.g., be a configuration that is acceptable in performance for the memory accesses by the always-on component 16.

The memory-only communication mode may also be used by the display controller 34, to permit the display controller 34 to read frames 38 from the memory 12. In this case, at least the portion of the communication fabric 27 between the display controller 34 and the memory controller 22 may be powered up as well. The display controller 34 and the always-on component 16 may share access to the memory controller 22/memory 12 using the memory-only communication mode.

When the SOC 10 is powered down with the always-on component 16 remaining powered, part of the power down sequence may be to place the memory 12 in a retention mode. For example, for dynamic random access memory (DRAM) embodiments of the memory 12, the retention mode may be a "self-refresh" mode. In retention mode, the memory 12 may not be externally accessible until the mode is changed. However, the contents of the memory 12 may be preserved. For example, in the self-refresh mode, the DRAM may perform the periodic refreshes needed to retain data (which are normally performed by the memory controller 22, when the memory controller 22 is powered on).

In some embodiments, the always-on component 16 may further store programmable configuration data for other components in the SOC 10. The programmable configuration data may reflect the state of the components at the time that the remainder of the SOC 10 was most recently powered down. The always-on component 16 may be configured to wake the SOC 10 for processing, and may reprogram the components with the stored programmable configuration data. The process of restoring state to the components based on the stored programmable configuration data may be referred to as reconfiguration. Again, similar to the memory-only communication mode discussed above, the state that is restored to the components may be the state at the most recent power down of the component or may be a known-good state with acceptable performance for restarting the SOC 10 for operation. In the latter case, the state may be modified to a higher performance state after the reconfiguration has completed. Furthermore, the always-on component 16 may program the display controller 34 after power is restored to the display controller 34 when switching to the sleep 1 state described below from a different state in which the display controller 34 is powered off.

The always-on component 16 may be configured to communicate with the PMU 156, in addition to the communication of the PMGR 32 to the PMU 156. The interface between the PMU 156 and the always-on component 16 may permit the always-on component 16 to cause components to be powered up (e.g. the memory controller 22, the display controller 34, or the other components of the SOC 10) when the PMGR 32 is powered down. The interface may also permit the always-on component 16 to control its own power state as well.

Generally, a component may be referred to as powered on or powered off. The component may be powered on if it is receiving supply voltage so that it may operate as designed. If the component is powered off, then it is not receiving the supply voltage and is not in operation. The component may also be referred to as powered up if it is powered on, and powered down if it is powered off. Powering up a component may refer to supplying the supply voltage to a component that is powered off, and powering down the component may refer to terminating the supply of the supply voltage to the component. Similarly, any subcomponent and/or the SOC 10 as a whole may be referred to as powered up/down, etc. A component may be a predefined block of circuitry which provides a specified function within the SOC 10 and which has a specific interface to the rest of the SOC 10. Thus, the always-on component 16, the peripherals 18A-18B, and the CPU complex 14, the memory controller 22, and the PMGR 32 may each be examples of a component.

A component may be active if it is powered up and not clock gated. Thus, for example, a processor in the CPU complex 14 may be available for instruction execution if it is active. A component may be inactive if it is powered off or in another low power state in which a significant delay may be experienced before the component may operate and interact with other components. For example, if the component requires a reset or a relock of a phase lock loop (PLL), it may be inactive even if it remains powered. A component may also be inactive if it is clock gated. Clock gating may refer to techniques in which the clock to the digital circuitry in the component is temporarily "turned off," preventing state from being captured from the digital circuitry in clocked storage devices such as flops, registers, etc.

As mentioned above, the CPU complex 14 may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors. The CPU complex 14 may further include other hardware such as an L2 cache and/or an interface to the other components of the system (e.g. an interface to the communication fabric 27).

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18 may be any set of additional hardware functionality included in the SOC 10. For example, the peripherals 18 may include video peripherals such as an image signal processor configured to process image capture data from a camera or other image sensor, GPUs, video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The interconnection to external device is illustrated by the dashed arrow in FIG. 1 that extends external to the SOC 10. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

The PMGR 32 may be configured to control the supply voltage magnitudes requested from the PMU 156. There may be multiple supply voltages generated by the PMU 156 for the SOC 10. For example, there may be a supply voltage for the CPU complex 14 and at least one supply voltage for the rest of the SOC 10 outside of the CPU complex 14. For example, there may be separate supply voltages for the memory controller power domain 26, the display controller power domain 28, and the always-on power domain 24, in addition to the supply voltage for the other components. In another embodiment, the same supply voltage may serve the memory controller power domain 26, the display controller power domain 28, the always-on power domain 24, and the other components of the SOC 10 and power gating may be employed based on the power domains. There may be multiple supply voltages for the rest of the SOC 10, in some embodiments. In some embodiments, there may also be a memory supply voltage for various memory arrays in the CPU complex 14 and/or the SOC 10. The memory supply voltage may be used with the voltage supplied to the logic circuitry, which may have a lower voltage magnitude than that required to ensure robust memory operation. The PMGR 32 may be under direct software control (e.g. software may directly request the power up and/or power down of components) and/or may be configured to monitor the SOC 10 and determine when various components are to be powered up or powered down.

The PMU 156 may generally include the circuitry to generate supply voltages and to provide those supply voltages to other components of the system such as the SOC 10, the memory 12 ($V_{MEM}$ in FIG. 1), various off-chip peripheral components (not shown in FIG. 1) such as display devices, image sensors, user interface devices, etc. The PMU 156 may thus include programmable voltage regulators, logic to interface to the SOC 10 and more particularly the PMGR 32 to receive voltage requests, etc.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1.

Figure 2:
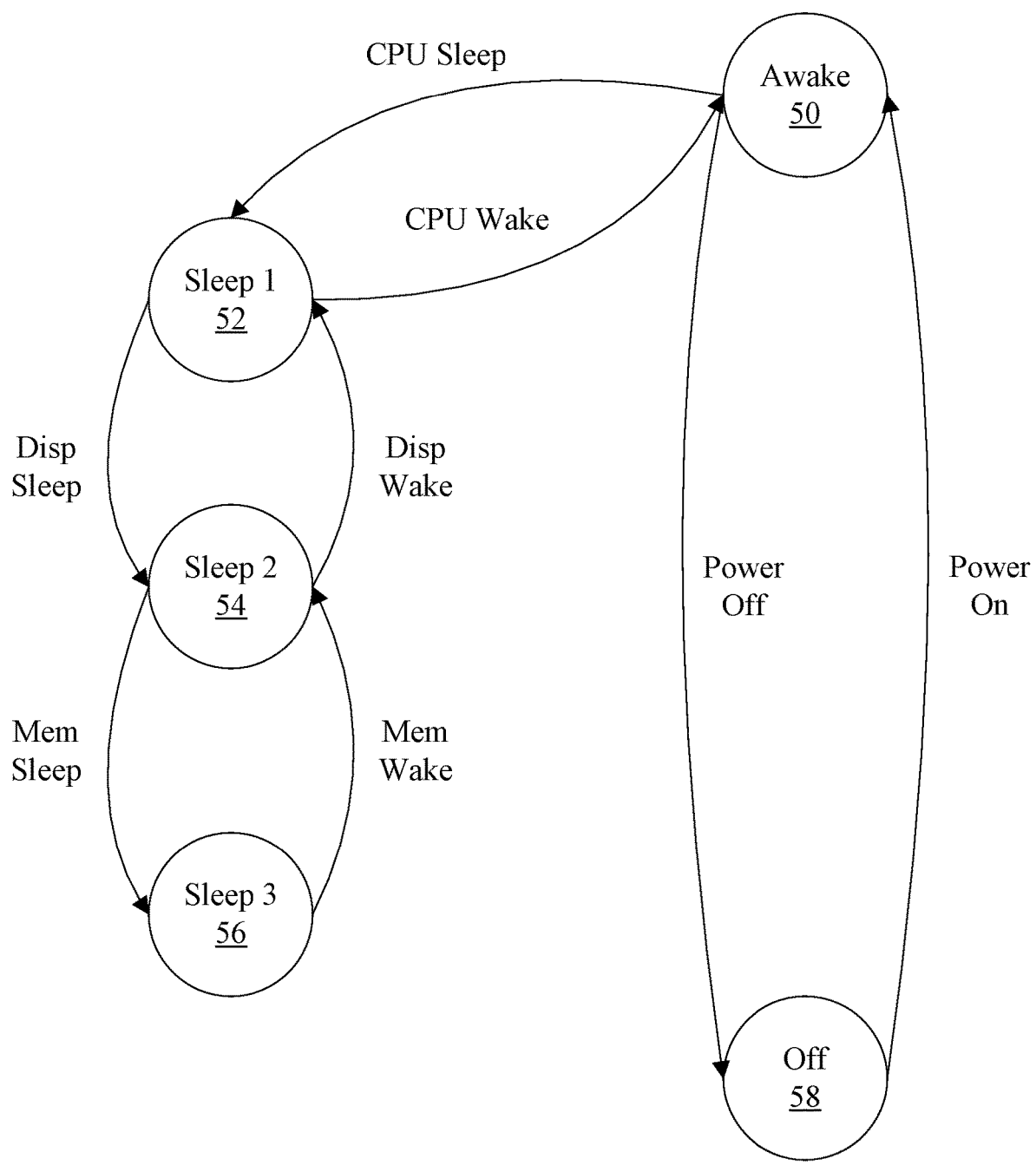
FIG. 2 is a state machine illustrating one embodiment of power states supported by the system.

Turning now to FIG. 2, a block diagram of a state machine illustrating one embodiment of a plurality of power states that may be employed by one embodiment of the SOC 10 is shown. In the illustrated embodiment, the state machine includes an awake state 50, a sleep 1 state 52, a sleep 2 state 54, a sleep 3 state 56, and an off state 58. The vertical alignment of the states in FIG. 2 may be an indication of the relative power consumption at each state (not to scale). That is, the awake state 50 may be the highest power-consuming state, the sleep 1 state 52 may be lower power than the awake state 50, the sleep 2 state 54 may be lower power than the sleep 1 state 52, the sleep 3 state 56 may be lower power than the sleep 2 state 54, and the off state 58 may be the lowest power state.

Each state in the state machine of FIG. 2 may be associated with at least one combination of power domains being powered on and/or components within a power domain being operable, and in some cases a state may be associated with multiple combinations of power domains being powered on/operable components. For example, the awake state 50 may be associated with a power on state for at least one of the CPUs 30, and various combinations of the CPUs 30 being powered on may be supported in the awake state 50. Generally, a power state may include at least one combination of power domains powered on while other power domains are powered off and/or at least one combination of components with the power domains that are active and available for use.

In the off state 58, all power domains may be powered off. The SOC 10 and the memory 12 may not be receiving power. In response to a power on event in the system (e.g. a user pressing a power on button to start the system), the state machine may transition awake state 50 ("power on" arc in FIG. 2). Each power domain may be powered up in the awake state, and each component of the SOC 10 may be operable. In some cases, a component may be clock gated, or even power gated, in the awake state 50 because the component is not in use, but the components may come up from the off state 50 in the active state. The CPUs 30 may boot the system, initializing components as desired, and may determine which components will remain powered on. If the system is powering down (e.g. due to user pressing the power button for a sufficient period of time), the state machine may transition from the awake state 50 to the off state 58 ("power off" arc in FIG. 2). In an embodiment, there may be power off arcs from other states 52, 54, and 56. In another embodiment, transitioning off may be performed from the awake state 50 to permit the CPUs 30 to save any desired information to permit recovery of the current state when the system is powered on again.

From the awake state 50, the state machine may transition to the sleep 1 state 52. In the sleep 1 state 52, the power domains 24, 26, and 28 are powered on to permit the display controller 34 to display frames 38 from the memory 12 on the display 42. Other power domains, including the power domain(s) for the CPUs 30, may be powered down. The transition from the awake state 50 to the sleep 1 state 52 may be performed when the CPUs 30 are put in a sleep state (e.g. power gated—"CPU sleep" arc in FIG. 2). The state machine may transition from the sleep 1 state 52 to the awake state 50 responsive to an event that causes the CPUs 30 to return to operation (or wake up). The transition is illustrated as the "CPU wake" arc in FIG. 2. In an embodiment, there may be CPU wake transitions from other sleep states 54 and 56, rather than transitioning through the sleep 1 state 52. However, passing through the sleep 1 state 52 may permit the display controller 34 to being displaying frames, making the system appear responsive to the wake event more quickly.

While in the sleep 1 state 52, the display controller 34 (and more particularly the processor 36 executing driver software, in an embodiment) may determine that the display controller 34 has completed the display of a frame. The frames may have a timestamp or other indication of the time at which the frame is to be displayed. The indication may be an absolute time stamp measured from the time kept in the system. The indication may relative, e.g. to the time at which the previous frame was displayed. Any indication may be used. When the display controller 34 has completed the display of a frame, the display controller 34 may detect a sleep state for the display controller 34 responsive to the delay to the next frame being large enough to make transition to a lower power state worthwhile (e.g. the power saved will outweigh power expending to shut down the display controller 34, power the display controller 34 back up again, and restore state to the display controller 34). If such an event is detected, the state machine may transition to the sleep 2 state 54 ("disp sleep" arc in FIG. 2). In other embodiments, the frames 38 may be displayed at a specified frame rate (e.g. video playback) and thus the time stamps may not be explicitly provided for each frame.

In the sleep 2 state 54, the power domain 28 is powered down (and the remainder of the SOC 10, as in the sleep 1 state 52) but the power domains 24 and 26 remain powered. In the sleep 2 state 54, the memory-only communication mode may be available for the always-on component 16. The always-on component 16 may determine that access to memory 12 is not expected to be needed for a period of time, and may cause a transition to the sleep 3 state 56 ("mem sleep" arc in FIG. 2). In the sleep 3 state 56, the power domain 24 is powered but the power domains 28 and 26 are powered down (and the remainder of the SOC 10). The memory 12 may be powered but placed in self refresh mode (in which the memory 12 internally generates refreshes to protect the contents of the memory 12). The always-on component 16 may detect that the memory-only communication mode is to be restored, transitioning the state machine back to the sleep 2 state 54 ("mem wake" arc in FIG. 2). Similarly, the always-on component 16 may detect that the display controller 34 is to wake up, transition the state machine back to the sleep 1 state 52 ("disp wake" arc in FIG. 2). As with the above discussion, the state machine may support direct transitions between the sleep 3 state 56 and the sleep 1 state 52 and/or the awake state 50, if desired.

Figure 3:
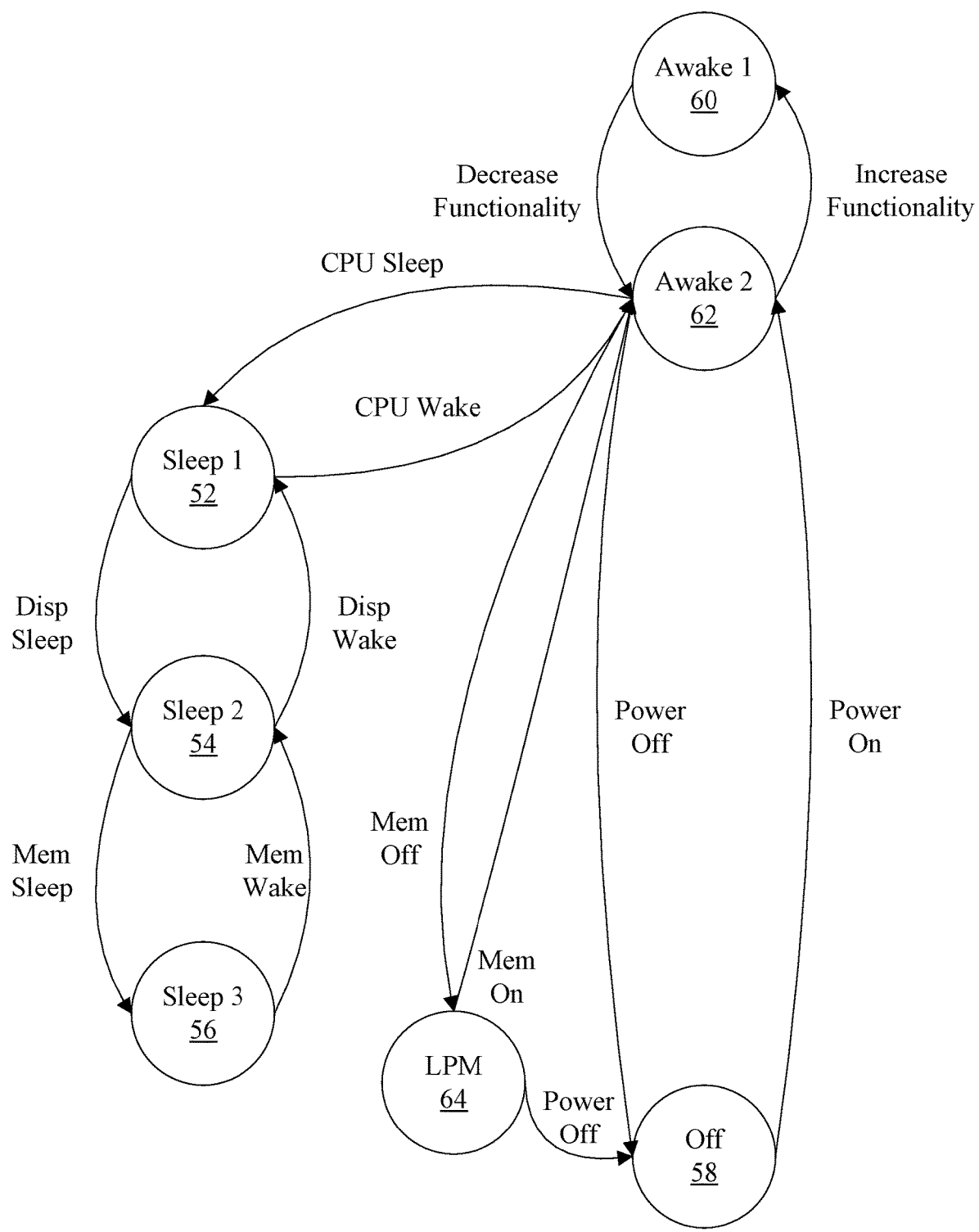
FIG. 3 is a state machine illustrating another embodiment of power states supported by the system.

FIG. 3 is a block diagram of another state machine, illustrating another embodiment of a plurality of power states that may be employed by one embodiment of the SOC 10 is shown. In the illustrated embodiment, the state machine includes an awake 1 state 60, an awake 2 state 62, the sleep 1 state 52, the sleep 2 state 54, the sleep 3 state 56, a low power mode (LPM) state 64, and the off state 58. The vertical alignment of the states in FIG. 3 may be an indication of the relative power consumption at each state (not to scale). That is, the awake 1 state 60 may be the highest power consuming state, the awake 2 state 62 may be lower power than the awake 1 state 60, the sleep 1 state 52 may be lower power than the awake 2 state 62, the sleep 2 state 54 may be lower power than the sleep 1 state 52, the sleep 3 state 56 may be lower power than the sleep 2 state 54, the LPM state 64 may be lower power than the sleep 3 state 56, and the off state 58 may be the lowest power state.

The sleep 1 state 52, the sleep 2 state 54, the sleep 3 state 56, and the transitions therebetween may be similar to the discussion above with regard to FIG. 2. When the CPUs 30 are entering the sleep state, the transition may be from the awake 2 state 62 to the sleep 1 state 52 ("CPU sleep" arc in FIG. 3). Exiting the sleep 1 state 52 when the CPU wakes ("CPU wake" arc in FIG. 3) may be a transition to the awake 2 state 62. In other embodiments, there may be direct wake and sleep transitions to/from the awake 1 state 60 and the sleep 1 state 52, in addition to or instead of transitions from the awake 2 state 62. Similarly, there may be direct transitions from the awake 2 state 62 and/or the awake 1 state 60 to/from the sleep 2 state 54 and/or the sleep 3 state 56.

The awake 1 state 60 and the awake 2 state 62 may correspond to two functionality modes in the SOC 10. The awake 1 state 60 may be a high functionality mode, and the awake 2 state 62 may be a lower functionality mode. For example, the components of the SOC 10 that are operable and available for use in the states 60 and 62 may differ, with more components available in the awake 1 state 60 than in the awake 2 state 62. Accordingly, if increased functionality is desired when the SOC 10 is operating in awake 2 state 62 (e.g., components that are not available in awake 2 state 62 are desired), the state machine may transition to the awake 1 state 60 and the unavailable components may be powered on and made available. If the SOC 10 is operating in awake 1 state 60 and decreased functionality is desired (e.g. the components that are available in awake 1 state 60 but not available awake 2 state 62 are no longer in use), the state machine may transition to the awake 2 state 62 and the components may be powered down.

The LPM state 64 may be a low power mode in which at least some of the SOC 10 is powered and active, but the memory 12 is powered off. Thus, transitions to/from the awake 2 state 62 are performed for the state 64 when the memory is powered on ("mem on" arc in FIG. 3) or powered of ("mem off" arc in FIG. 3). The LPM state 64 may support a transition to the off state 58 as well, in response to a power off event in the system ("power off" arc in FIG. 3). The awake 2 state 62 may also support a power off transition to the off state ("power off" arc from the state 62 to the state 58 in FIG. 3) and the system may transition to the awake 2 state 62 in response to a power on event in the system ("power on" arc in FIG. 3). The power on event may cause a transition directly to the awake 1 state 60 in other embodiments, in addition to or instead of the transition to the awake 2 state 62. For example, a mode may be programmed into non-volatile storage in the system to select whether a power on event transitions from the off state 58 to the awake 2 state 62 or to the awake 1 state 60.

Figure 4:
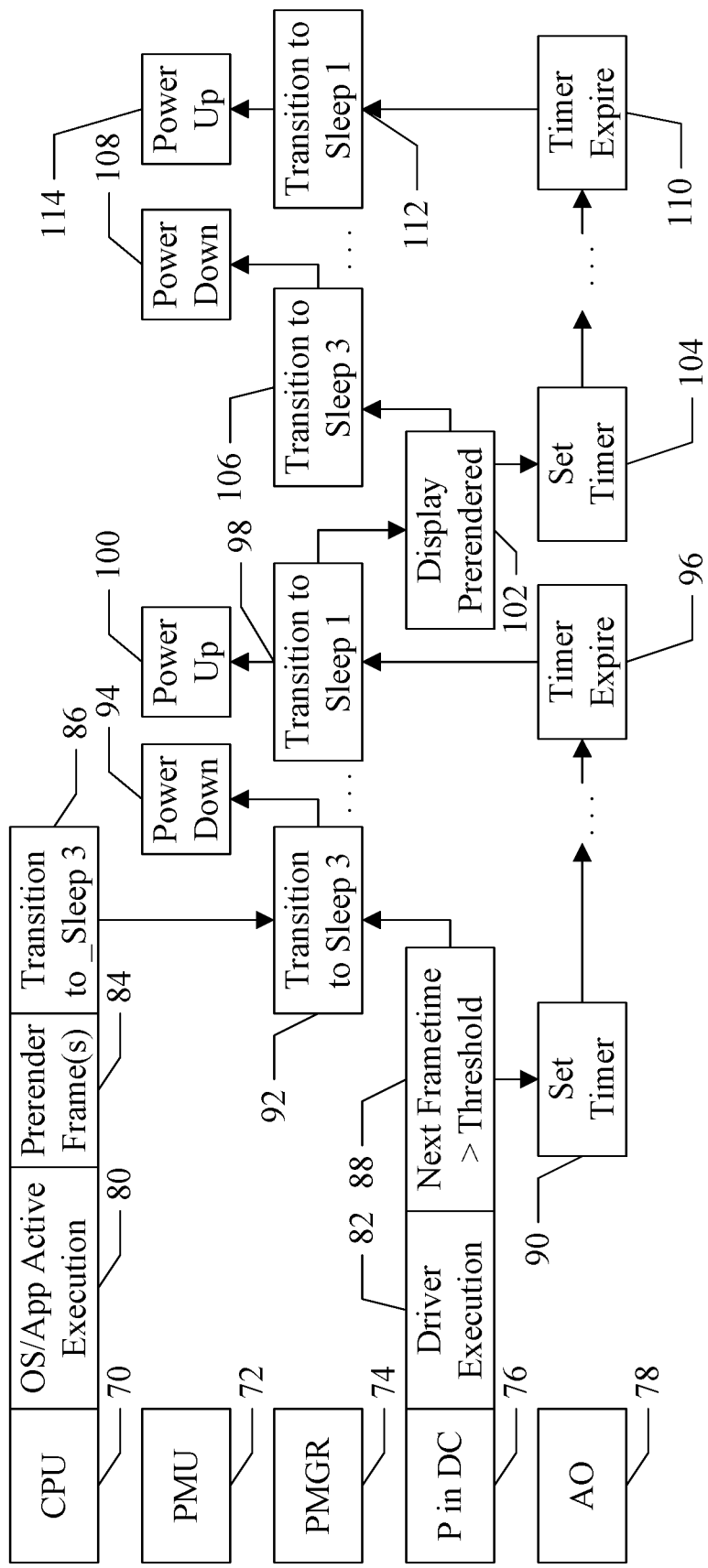
FIG. 4 is a flow diagram illustrating operation of one embodiment of various components in the system of FIG. 1.

FIG. 4 is a flow diagram illustrating operation of various embodiments of components of the SOC 10 to display prerendered frames during times that the CPUs 30 are powered down, using the sleep 1 state 52 and the sleep 3 state 56. Particularly, the diagram of FIG. 4 illustrates operation of the CPUs 30 (reference numeral 70), the PMU 156 (reference numeral 72), the PMGR 32 (reference numeral 74), the processor 36 in the display controller 34 (reference numeral 76), and the always-on component 16 (reference numeral 78). Time increases from left to right in FIG. 4.

Initially, the SOC 10 may be in the awake state 50 (or one of the awake 1 or awake 2 states 60 or 62). The CPUs 30 may be in active execution of the operating system/applications (OS/App) (reference numeral 80). The processor 36 in the display controller 34 may be executing driver code (e.g. a portion of the driver functionality for the display controller 34 or even all of the driver functionality) (reference numeral 82). The OS/App may determine that the CPUs 30 are going to go to sleep for a time period. The OS/App may prerender a set of frames 38 for the display controller 34 to display during the time that the CPUs 30 are sleeping, and may write the frames 38 to the memory 12 (reference numeral 84). As mentioned previously, one or more GPUs or other video processing elements may be used to perform a portion of the rendering as well. The prerendered frames may have attributes assigned to them, which may include a timestamp that may be used by the display controller 34 to determine when each frame 38 should be displayed (or a regular time interval such as a frame rate may be used). Other attributes may be assigned as well. Once the frames have been prerendered to memory 12, the CPUs 30 may indicate that the system may transition to the sleep 3 state 56 (reference numeral 86).

The processor 36 in the display controller 34 may be configured to determine that the next frame time (e.g. the time that the next frame is to be displayed) is greater than a threshold amount (reference numeral 88) and may set a timer in the always-on component 16 to wake the display controller 34 when the timer expires, in time to power up the display controller 34, the memory controller 22, and the portion of the communication fabric 27 between the display controller 34 and the memory controller 22, initialize, exit self refresh mode in the memory 12, read the frame from the memory 12, and process the frame for display on the display 42 (reference numeral 90). The time to power up the display controller 34, the memory controller 22, and the portion of the communication fabric 27, initialize, exit self refresh mode in the memory 12, read the frame from the memory 12, and process the frame for display may be referred to as the display controller wake latency. The threshold may be selected based on a variety of factors, including the display controller wake latency. That is, if the next frame time is not greater than the display controller wake latency, the display controller 34 may not actually power down. The threshold may be selected to be greater than the display controller wake latency, to allow the display controller 34 to remain powered down for a period of time to conserve power.

If the next frame is greater than the threshold, the processor 36 in the display controller 34 may also signal the PMGR 32 to transition to the sleep 3 state 56. The PMGR 32 may make the transition (reference numeral 92), and may power down the power domains of the CPUs 30 and the display controller 34 (reference numeral 94), e.g. by de-energizing one or more power rails, disabling power switches to the powered down component, or a combination of these techniques.

At a later point (illustrated by the ellipses in FIG. 4), the timer in the always-on component 16 may expire (reference numeral 96). The always-on component may signal the PMGR 32 to transition to the sleep 1 state 52 (reference numeral 98). The PMGR 32, in concert with the PMU 156, if needed, may cause the power up of any voltage rails that were powered down in the transition to the sleep 3 state 56 (reference numeral 100). When power has been restored, the PMGR 32 may complete the transition to the sleep 1 state 52. The display controller 34 may read the next prerendered frame from the memory 12, and may display the prerendered frame (reference numeral 102). Assuming the next frame time is again greater than the threshold, the display controller 34 may set the timer in the always-on component 16 (reference numeral 104) and may signal the PMGR 32 to transition to the sleep 3 state (reference numeral 106). The PMGR 32 may power down the appropriate power domains (reference numeral 108). Later, the timer may expire again (reference numeral 110) and the PMGR 32 may transition to the sleep 1 state 52 (reference numeral 112). The PMGR 32 may power up the appropriate power rails (reference numeral 114) for the display of the next frame.

Accordingly, a series of transitions between the sleep 1 state 52 and the sleep 3 state 56 (either through the sleep 2 state 54, or directly between the states 52 and 56, in various embodiments) may be made during the time that the CPUs 30 are powered down to allow the frames to be displayed (referred to herein as an always-on display mode). At a point near the end of the sequence (e.g. when the number of prerendered frames 38 available to display is reduced to a certain point or the amount of time represented by the remaining prerendered frames 38, based on the time stamps associated with frames or a specified frame rate), the CPUs 30 may be awakened to prerender more frames 38 for display (and/or to do other processing work for the OS/App as desired). Another timer in the always-on component 16 or the PMGR 32 may expire to wake the CPUs 30, for example. In another example, the processor 36 in the display controller 34 may determine that the number of frames 38 remaining to be displayed (or the amount of time to the end of the frames 38) is below a threshold to wake the CPUs 30. The CPUs 30 and/or the GPUs may render additional frames, but the system overall may still effectively remain idle. That is, always-on display mode may still effectively be active even though the CPUs 30 and/or the GPUs are actively processing to prerender additional frames. Once the next set of frames have been rendered, the system may return to transitioning between the sleep 1 state and the sleep 3 state to display the newly rendered frames.

It is noted that the always-on display mode may be interrupted (e.g. if the user begins actively interacting with the system again while always-on display mode is active). The system may exit always-on display mode and return to active mode with the CPUs 30 executing the operating system and generally controlling the system. The display controller 34 and/or the processor 36 may take action while the transition is occurring to make the system appear responsive to the user interaction. For example, if the user was listening to audio or watching video and presses a button such as the pause button, fast forward or rewind, skip, or other control button, the display controller 34 and/or the processor 36 may display a different form of the button that indicates that it was pressed. The display controller 34 and/or the processor 36 may brighten the screen or take any other action that indicates that the system is responding to the user, in various embodiments.

Figure 5:
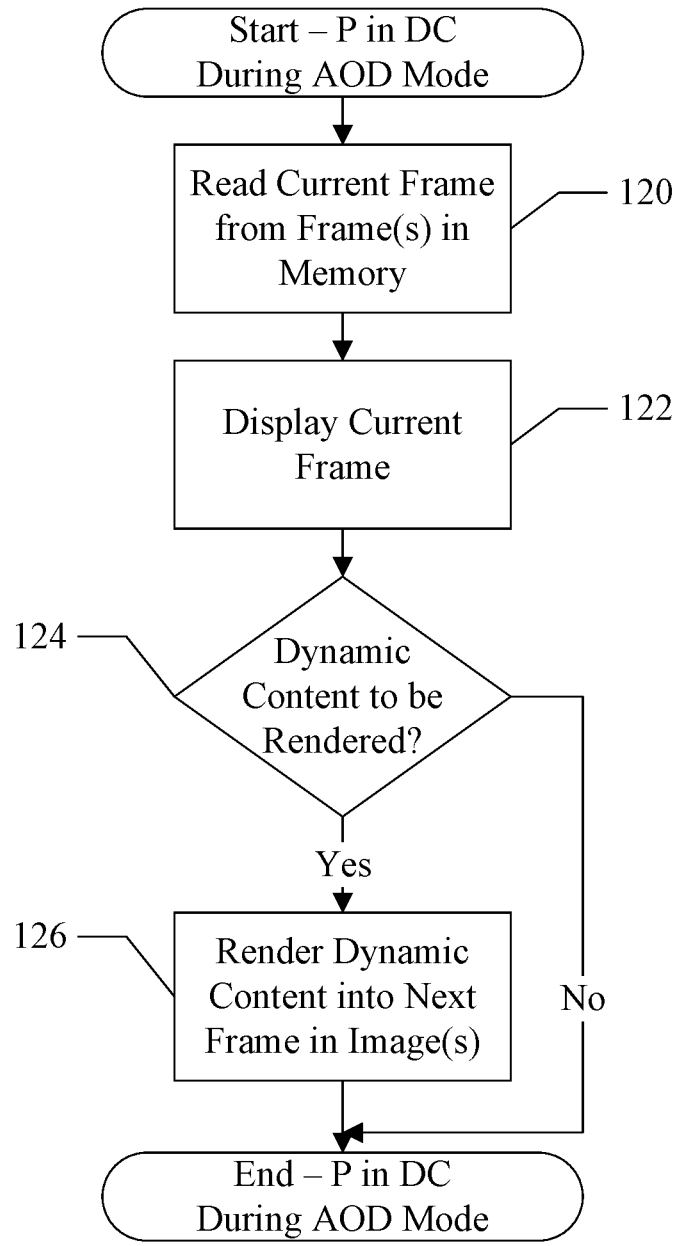
FIG. 5 is a flowchart illustration operation of one embodiment of a processor included in a display controller shown in FIG. 1.

FIG. 5 is a flowchart illustrating operation of one embodiment of the display controller 34 and/or the processor 36 during the always-on display mode (e.g. when the state is transitioning between the sleep 1 state 52 and the sleep 3 state 56 while frames are displayed on the display 42). While the blocks are shown in a particular order for ease of understanding, other orders may be used. Blocks may be performed in parallel by combinatorial logic circuits in the display controller 34 and/or may be pipelined over multiple clock cycles. The driver software executed by the processor 36 may include instructions which, when executed, implement the operation illustrated in FIG. 5 and described for the processor 36.

The processor 36 may cause the display controller 34 to read the current frame from the frames 38 in the memory 12 (reference numeral 120). The processor 36 may process the current frame and transmit the processed frame to the display 42 for display (reference numeral 122). Processing the current frame may include blending the frame with other data (e.g. ambient light sensor modifications), for example.

In an embodiment, the processor 36 may also be configured to perform certain rendering operations while operating in the sleep 1 state 52. For example, there may be certain dynamic content to be rendered into the frame. Dynamic content may include content that is not present during the prerendering phase because the dynamic content is not generated until a later point in time. The processor 36 may be configured to cause the display controller to render the dynamic content for the next frame after displaying the current frame (or may perform the rendering itself). For typical frame times (e.g. on the order of tens per second, e.g. 30 per second or 60 per second) the dynamic content may be reasonably accurate if handled in this way. Thus, if there is dynamic content to be rendered (decision block 124, "yes" leg), the processor 36 may be configured to access the dynamic content and the next frame from the memory 12, and render the dynamic content into the next frame (block 126). For example, the always-on component 16 may periodically communicate with other components in the system (e.g. sensors that sense the signal strengths, etc.) and may update memory 12 with various values representing the dynamic content. The locations storing the dynamic content may be made available to the display controller 34 so that the data may be read and corresponding visual content may be rendered. In other embodiments, the display controller 34/processor 36 may update the current frame with dynamic content before displaying the dynamic content.

There may be a variety of types of dynamic data, in various embodiments. For example, in mobile devices that connect to a wireless cellular signal, the strength of the signal is often displayed as a set of ascending bars from left to right (e.g. 3-5 bars), referred to as the cellular signal strength meter herein. Different numbers of the bars are colored in a different color than the other bars to illustrate the signal strength on the cellular signal strength meter. For example, the weakest signals that are still considered a connection may be represented the leftmost bar in a bright color and the remaining bars in a lighter color (e.g. white may be bright and gray may be lighter). A stronger signal may be represented by the two leftmost bars in a bright color and the remaining bars in the lighter color; a still stronger signal may be represented by the three leftmost bars in a bright color and the remaining bars in a light color; etc. until the strongest signal is by all bars in a bright color. The signal strength varies as the position of the mobile device changes with respect to the nearby signal towers, as various physical blockages reduce the strength of the signal, as interference affects the signal, etc. Accordingly, the signal strength meter is unpredictable at the time of prerendering. Similarly, a mobile device that is connected to a WiFi wireless signal may be represented by an upwardly spreading series of arcs (e.g. 3 arcs) in a portion of a pie shape, referred to herein as the WiFi signal strength meter. Similar to the bars of the cellular signal strength meter, the arcs of the WiFi signal strength meter may be colored in bright colors or light colors (e.g. white and gray, respectively) to represent different levels of signal strength. The lowest signal strength that is considered connected may be represented with the lowest arc in the bright color and the remaining arcs in a lighter color; midlevel signal strengths may be represented with two lower arcs in a bright color and the remaining arcs in a lighter color; etc. until the strongest signal strengths are represented by all arcs in bright color.

There may be other types of dynamic content as well, such as the type of cellular signal being received (e.g. 3G, 4G, 5G, etc., LTE, etc.), the cellular carrier name, the battery charge indicator/percentage, a step count on a wrist-worn mobile device such as a smart watch or fitness band, a heart pulse count, other biometric data, etc.

In an embodiment, the various possible variations of the dynamic content may be prerendered and stored in memory 12. For example, the various possible views of the cellular signal strength meter and/or the WiFi signal strength meter may be prerendered, the text representing the cellular signal type may be prerendered, etc. In this case, the processor 36 may read the memory locations storing the data that describes the dynamic content (e.g. as updated by the always-on component 16), and the processor 36 may cause the display controller 34 to composite the prerendered visual representation of the dynamic content with the remaining prerendered frame data.

In an embodiment, the size of fully rendered frames may limit the number of prerendered frames that may be practically generated before entering the always-on display mode. However, in some cases, only a portion of the frame actually includes content, and the remainder of the frame being a background color (e.g. a dark color, such as black). Additionally, power may be saved by only displaying the portions that have content and turning off portions of the display that are only displaying a background color. The space savings/power savings may be achieved using one or more active regions on a display. The active regions may include the content actually being displayed, with other portions of the display being dark (e.g. displaying black). The display controller 34 may be configured to turn off rows of the display 42 that do not include pixels in the active regions. The turned-off rows will be black, which may be the same as a pixel displaying black as the color being driven to it.

Figure 6:
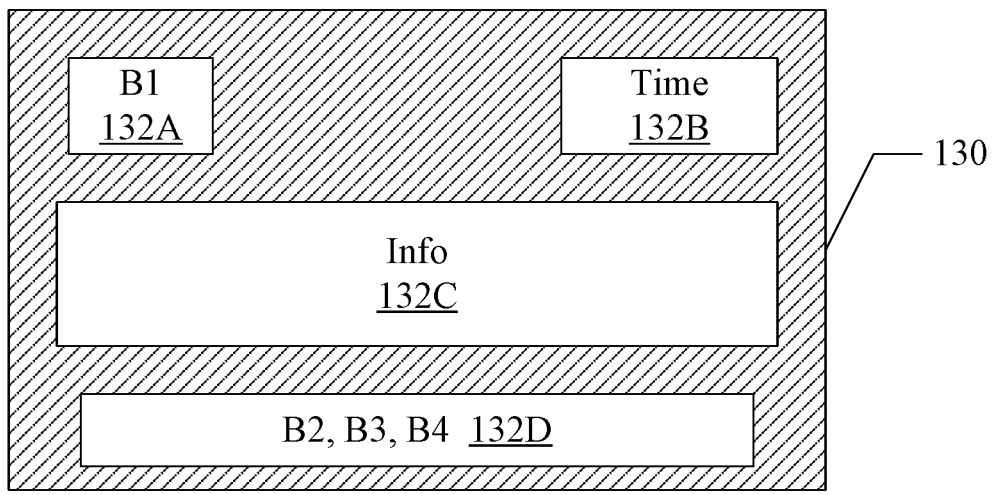
FIG. 6 is a block diagram illustrating one embodiment of active regions of a frame.

FIG. 6 is a block diagram of one embodiment of frame 130 that may have active regions defined in it. The frame 130 may be useful for a wrist-worn device such as smart watch or other such wearable device. When the system is operating in the always-on display mode, there may be four active regions 132A-132D in the frame 130 (although more or fewer active regions may be used). The remainder of the frame 130 may be black, represented by cross-hatching in FIG. 6. The active region 132A may be displaying a button (B1) which may be selected by the user by touching the area of the display corresponding to the active region 132 to perform a particular specified function. Similarly, the active region 132D may display a row of additional buttons B2, B3, and B4, each of which may be selected by a user to perform other specified function. A touch by the user on one of the buttons may cause the SOC 10 to exit the sleep 1 state 52 to the awake state 50 or the awake 2 state 62, for example. The active region 132B may display an indication of the time/date (e.g. a watch face displaying the time with the data above, below, or upon the watch face, or a digital display of time and the date above or below the time). In other embodiments, only an indication of time may be displayed. Other information may be displayed in the active region 132C (e.g. various notifications to the user, incoming messages for the user such as text messages, step counts and/or various biometric data, etc.).

Figure 7:
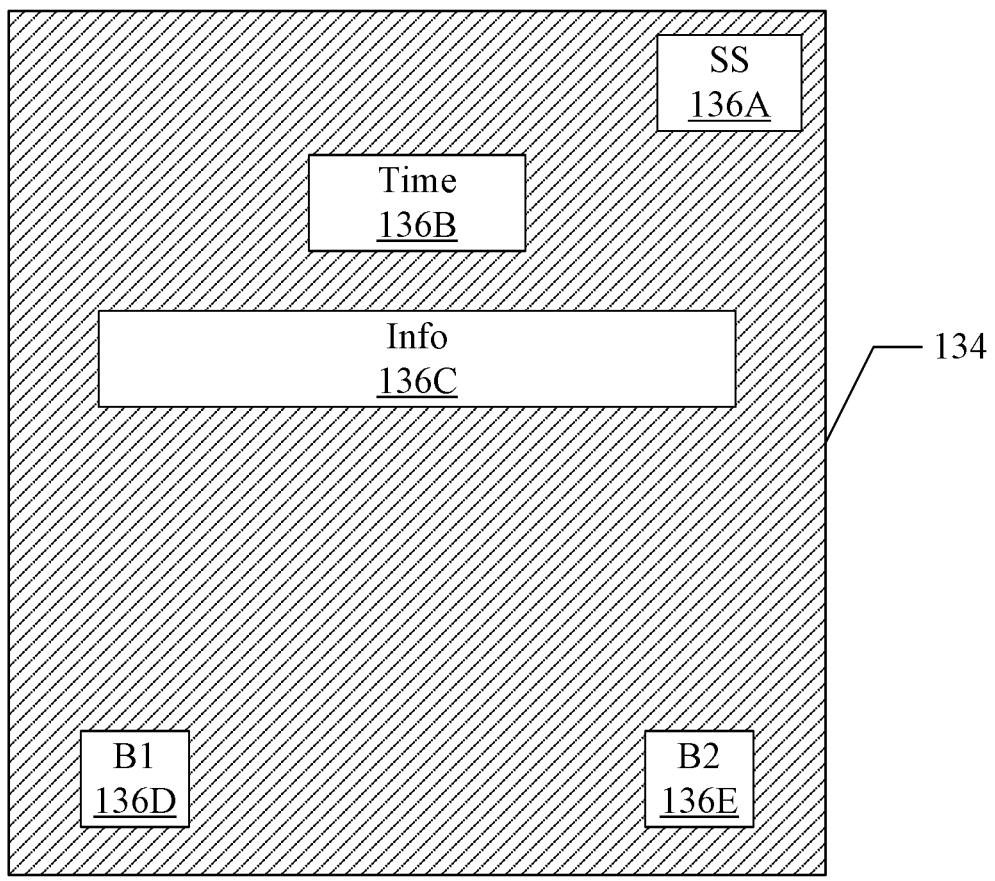
FIG. 7 is a block diagram illustrating another embodiment of active regions of a frame.

FIG. 7 is a block diagram of one embodiment of frame 134 that may have active regions defined in it. The frame 134 may be useful for a portable device such as a smart phone. When the system is operating in the always-on display mode, there may be five active regions 136A-136E in the frame 134 (although more or fewer active regions may be used). The remainder of the frame 134 may be black, represented by cross-hatching in FIG. 7. The active region 132A may be display signal strength indicators (SS) such as the cellular signal strength meter and/or the WiFi signal strength meter. Other dynamic information may be display in the active region 136A as well, such as the battery charge indicator and/or the type of cellular signal. The active region 136B may display an indication the time/date, similar to the above discussion with regard to FIG. 6. The active region 136C may display various other information, e.g. various notifications to the user, incoming messages for the user such as text messages, etc. The regions 136D and 136E may be displaying buttons (B1 and B2), which may be selected by the user by touching the area of the display corresponding to the active region 136D-136E to perform a particular specified function. A touch by the user on one of the buttons may cause the SOC 10 to exit the sleep 1 state 52 to the awake state 50 or the awake 2 state 62, for example.

Figure 8:
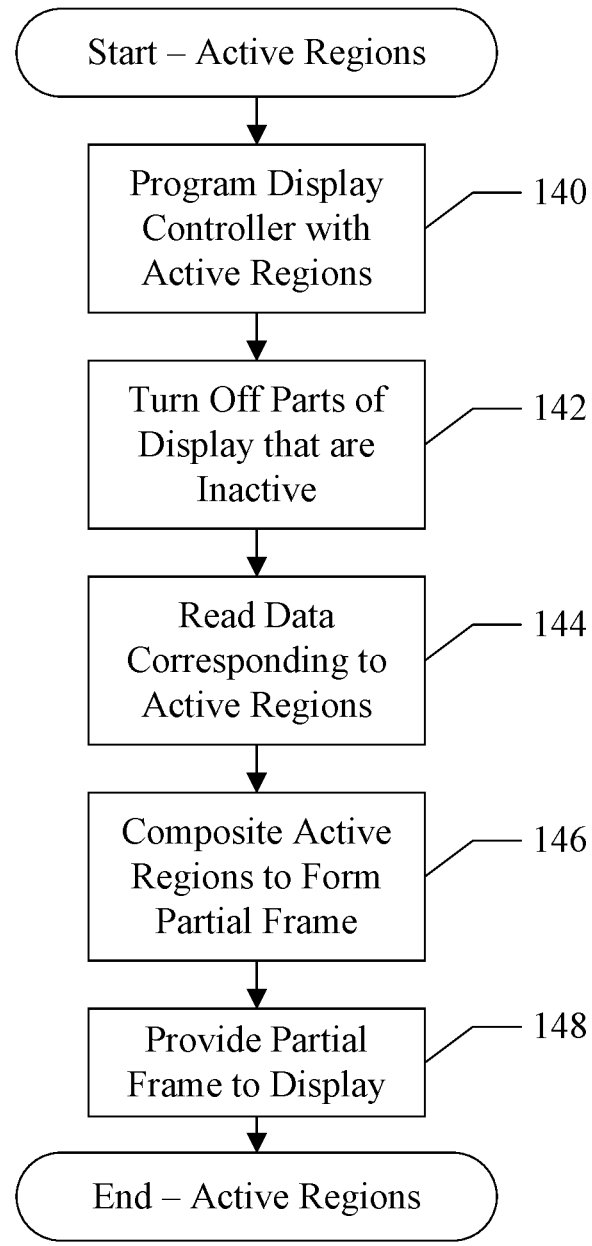
FIG. 8 is a flowchart illustrating one embodiment of the system to implement active regions.

FIG. 8 is a flowchart illustrating operation of one embodiment of the display controller 34 and/or the processor 36 for using active regions during the always-on display mode. While the blocks are shown in a particular order for ease of understanding, other orders may be used. Blocks may be performed in parallel by combinatorial logic circuits in the display controller 34 and/or may be pipelined over multiple clock cycles. The driver software executed by the processor 36 may include instructions which, when executed, implement the operation illustrated in FIG. 8 and described for the processor 36.

The display controller 34 may be programmed with data describing the active regions of the display (block 140). For example, the display controller 34 may include one or more configuration registers (not shown) that may be programmed with data describing the regions. For example, the pixel locations of opposite corners of a region may be used (top left and bottom right, or top right and bottom left). Any data that describes the area may be used. Block 140 may be performed during initialization of the system, or at entry to the always-on display mode, in some embodiments. The data describing the active regions may be part of the data restored by the always-on component 16 when the memory controller 34 is powered up, e.g. upon entry to the sleep 1 state 52.

When in the always-on display mode, the display controller 34 may communicate with the display 42 to turn off portions of the display that are not in use for the active regions (block 142). For example, the display controller 34 may turn off rows of the display 42 that have all inactive pixels as indicated by the active regions.

When a frame is ready to be displayed, the display controller 34 may read data describing the pixels from the active regions in memory 12 (block 144) and may composite the active regions to form a partial frame (block 146). The display controller may provide the partial frame to the display 42 for display (block 148).

Because various mobile devices may be carried/worn by the user as the user changes locations, the ambient light (e.g. from sunlight, when outside, or from various light fixtures, when inside) may change significantly. In an embodiment, various devices include one or more ambient light sensors (e.g. as one or more of the sensors 20). During normal operation (e.g. in the awake state 50, the awake 1 state 60, or the awake 2 state 62), the ambient light sensor may be periodically sampled and integrated over a time period to measure the amount of ambient light. When the amount of ambient light changes by more than a programmable threshold amount, the brightness of the screen may be adjusted to provide a more readable display for the user in various light conditions. When the ambient light is low, the screen may be dimmed somewhat, and when the ambient light is high, the screen may be brightened somewhat.

Figure 9:
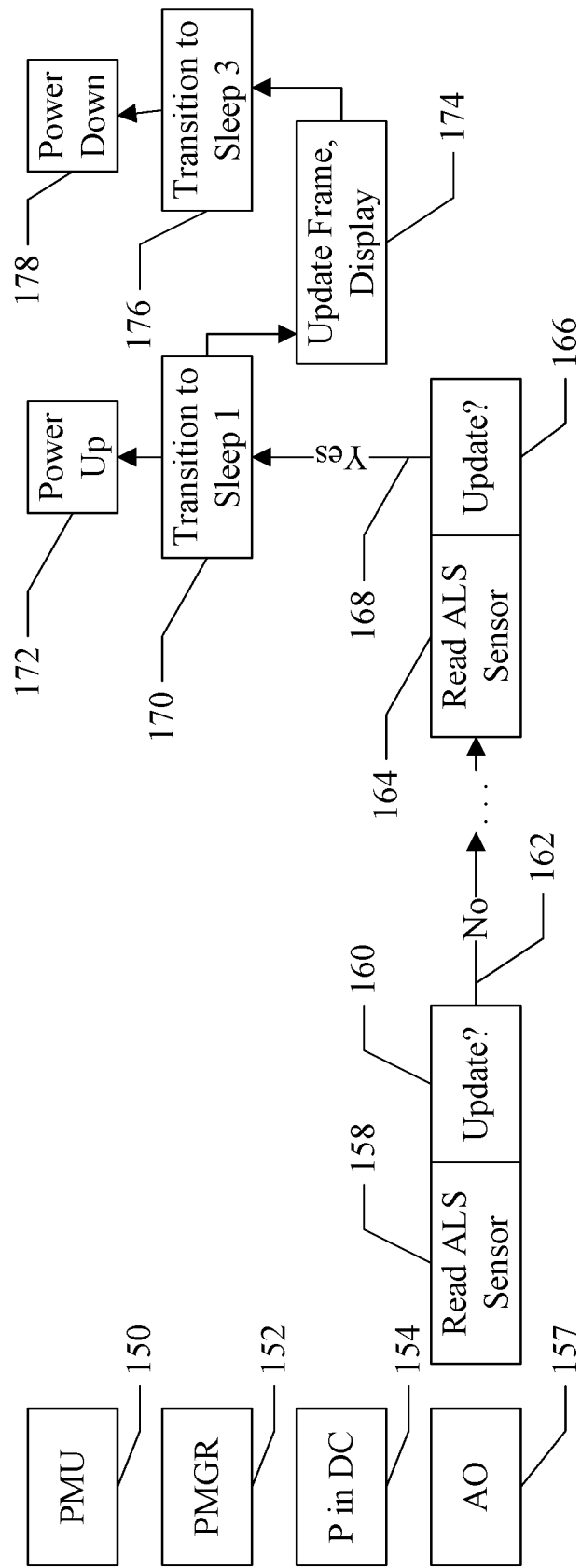
FIG. 9 is a flow diagram illustrating operation of one embodiment of the system for ambient light sensor (ALS) operation.

In always-on display mode, the ambient light sensor and ambient light compensation may be used as well. FIG. 9 is a flow diagram illustrating operation of various embodiments of components of the SOC 10 to manage ambient light sensing and compensation during times that the CPUs 30 are powered down, using the sleep 1 state 52 and the sleep 3 state 56. Particularly, the diagram of FIG. 9 illustrates operation of the PMU 156 (reference numeral 150), the PMGR 32 (reference numeral 152), the processor 36 in the display controller 34 (reference numeral 154), and the always-on component 16 (reference numeral 157).

At the beginning of the flow diagram of FIG. 9 (e.g. at the left, timing increasing toward the right), the state of the system is presumed to be the sleep 3 state 56. The always-on component 16 may periodically read the ambient light sensor(s) (reference numeral 158) and determine, based on previous readings and the current reading, if an update to the brightness controls for the display 42 is warranted based on changes in the ambient light (reference numeral 160). If an update is not warranted (e.g. reference numeral 162), no additional processing is needed. At a later time, the always-on component 16 may again read the ambient light sensor (reference numeral 164). The interval between the readings of the ambient light sensor may be programmable. For example, in one embodiment, an interval of approximately 50 milliseconds (ms) may be used (although other embodiments may use a longer or shorter interval). In this example, the value read at reference numeral 164 (in conjunction with previous readings) indicates an update (reference numerals 166 and 168). The always-on component 16 may communicate to the PMGR 32 to transition to the sleep 1 state 52 (reference numeral 170), and the PMGR 32 may communicate with the PMU 156 to power up the power supplies used by the sleep 1 state 52 (reference numeral 172). The processor 36 may update the currently displayed frame to change the brightness, and may update the display 42 and/or the display controller 34 to update the new brightness as needed (reference numeral 174). When the update is complete, the PMGR 32 may transition to the sleep 3 state 56 (reference numeral 176) and the PMGR 32 may communicate with the PMU 156 to power down the power supplies not used in the sleep 3 state 56 (reference numeral 178).

Figure 10:
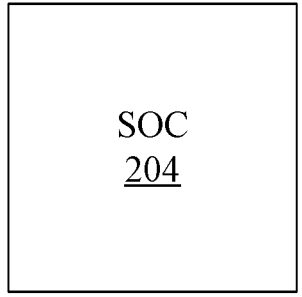
FIG. 10 is a block diagram of one embodiment of a computer accessible storage medium.

Turning now to FIG. 10, a block diagram of one embodiment of a computer readable storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 10 may store a database 204 representative of the SOC 10. Generally, the database 204 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 204 on the computer accessible storage medium 200 may be the netlist (with or without the synthesis library) or the data set, as desired.

While the computer accessible storage medium 200 stores a representation of the SOC 10, other embodiments may carry a representation of any portion of the SOC 10, as desired, including any subset of the CPU complex 14 or portions thereof, the memory controller 22 or portions thereof, the communication fabric 27, the display controller 34 or portions thereof, the always-on component 16 ore portions thereof, the PMGR 32 or portions there, other components and/or peripherals, etc. The database 204 may represent any portion of the above.

In accordance with the above disclosure, in one embodiment, a system may comprise: one or more processors forming central processing units (CPUs) for the system; a display controller configured to read frames from a memory and process the frames for display on a display device; a memory controller configured to interface to memory on behalf of the one or more processors and the display controller; a plurality of components; an interconnect coupled to the one or more processors, the display controller, the plurality of components, and the memory controller; and a power management circuit coupled to the one or more processors, the display controller, the memory controller, and the interconnect. The power management circuit is configured to establish one of a plurality of power states in the system. In a first power state of the plurality of power states the display controller, the memory controller, and at least a portion of the interconnect between the memory controller and the display controller are powered up while the one or more processors and the plurality of components are powered down. In first power state, the display controller is configured to display a plurality of prerendered frames on the display device. The plurality of prerendered frames are stored in the memory controlled by the memory controller. The display controller is configured to read a given frame of the plurality of prerendered frames over the interconnect from the memory controller and to display the given frame. In an embodiment, the display controller is configured to display the plurality of prerendered frames according to time stamps associated with the plurality of prerendered frames. In an embodiment, the system further comprises a first component that remains powered when other portions of the system are powered down. The first component comprises a timer, and the display controller is configured to set the timer based on a time stamp of a next frame of the plurality of prerendered frames. In an embodiment, the display controller is configured to power down responsive to completing display of the given frame and setting the timer. In an embodiment, the display controller includes a second processor configured to execute instructions to read the given frame. In an embodiment, the second processor is further configured to execute additional instructions to modify a next frame of the plurality of prerendered frames based on one or more dynamic content locations identified for the next frame. In an embodiment, the given frame includes one or more active regions, and the display controller is configured to deactivate portions of the display that are excluded from the one or more active regions. In an embodiment, the display controller is configured to drive data to the display for portions of the display that are within the one or more active regions. In an embodiment, the system further comprises a first component that is powered in a second power state of the plurality of power states, wherein the display controller is not powered in the second power state. The system still further comprises an ambient light sensor coupled to the first component, wherein the first component is configured to read the ambient light sensor and, responsive to detecting a change in ambient light that is greater than a threshold, the first component is configured to cause a change to the first power state. In an embodiment, the display controller is configured to update a displayed frame to reflect the change in the ambient light. In an embodiment, the first component is powered in the plurality of power states except for a third power state is which the system is off.

In an embodiment, an integrated circuit comprises: one or more processors forming central processing units (CPUs) for the system; a display controller configured to read frames from a memory and process the frames for display on a display device; a memory controller configured to interface to memory on behalf of the one or more processors and the display controller; and a power management circuit coupled to the one or more processors, the display controller, and the memory controller. The power management circuit is configured to establish one of a plurality of power states in the integrated circuit. In a first power state of the plurality of power states in the system, the display controller and the memory controller are powered up while the one or more processors are powered down. In the first power state the display controller is configured to read a given frame of a plurality of prerendered frames from the memory and to display the given frame. In an embodiment, the display controller is configured to display the plurality of prerendered frames according to time stamps associated with the plurality of prerendered frames. The integrated circuit is configured to transition to a second power state of the plurality of power states in which the display controller is powered off between displaying respective ones of the plurality of prerendered frames. In an embodiment, the integrated circuit further comprises a first component that remains powered when other portions of the system are powered down. The first component comprises a timer. The display controller is configured to set the timer based on a time stamp of a next frame of the plurality of prerendered frames. The first component is configured to cause a transition to the first power state responsive to expiration of the timer. In an embodiment, the display controller is configured to modify a next frame of the plurality of prerendered frames with dynamic content identified for the plurality of prerendered frames. In an embodiment, the dynamic content comprises at least one signal strength indicator. In an embodiment, the dynamic content comprises an indication of time. In an embodiment, the integrated circuit further comprises a first component that remains powered when other portions of the system are powered down. The first component is configured to read an ambient light sensor that is coupled to the integrated circuit during use. The first component is configured to detect a change in ambient light that is greater than a threshold, and the first component is configured to cause a change to the first power state responsive to detecting the change. In an embodiment, the display controller is configured to update a displayed frame to reflect the change in the ambient light.

In another embodiment, a method comprises powering a display controller and a memory controller in a system on a chip (SOC) in a first power state of a plurality of power states for the SOC, wherein one or more processors forming central processing units (CPUs) in the SOC are powered down in the first power state. The method further comprises reading a given frame of a plurality of prerendered frames from a memory controlled by the memory controller by the display controller in the first power state. The method still further comprises displaying the given frame by the display controller on a display in the first power state.

Numerous variations and modifications will become apparent to those skilled in the art once the above disclosure is fully appreciated. It is intended that the following claims be interpreted to embrace all such variations and modifications.

What is claimed is:

1. A system comprising:
a display controller configured to read frames from a memory and process the frames for display on a display device, wherein the display controller includes a processor configured to execute instructions;
a memory controller configured to interface to memory on behalf of the display controller;
a plurality of components;
an interconnect coupled to the display controller, the plurality of components, and the memory controller; and
a power management circuit coupled to the display controller, the memory controller, and the interconnect, wherein the power management circuit is configured to establish one of a plurality of power states in the system, and wherein, in a first power state of the plurality of power states the display controller, the memory controller, and at least a portion of the interconnect between the memory controller and the display controller are powered up while the plurality of components are powered down, and wherein, in the first power state:
the display controller is configured to display a plurality of prerendered frames on the display device, wherein the plurality of prerendered frames are stored in the memory controlled by the memory controller, wherein the display controller is configured to read a given frame of the plurality of prerendered frames over the interconnect from the memory controller and to display the given frame, and wherein the processor is configured to execute instructions to modify a next frame of the plurality of prerendered frames based on one or more dynamic content locations identified for the next frame.

2. The system as recited in claim 1 wherein a plurality of prerendered images representing respective potential dynamic content are stored in the memory, wherein the processor is configured to select a selected prerendered image of the plurality of prerendered images and composite the selected prerendered image into a corresponding dynamic content location of the one or more dynamic content locations in the next frame.

3. The system as recited in claim 1 wherein the dynamic content comprises at least one signal strength indicator.

4. The system as recited in claim 3 wherein the signal strength indicator indicates strength of a cellular signal received by the system.

5. The system as recited in claim 3 wherein the signal strength indicator indicates strength of a WiFi signal received by the system.

6. The system as recited in claim 3 wherein the processor is configured to communicate with a subsystem that manages the signal to determine the strength.

7. The system as recited in claim 3 wherein the dynamic content further comprises a name of a carrier providing the signal.

8. The system as recited in claim 3 wherein the dynamic content further comprises a type of the signal.

9. The system as recited in claim 1 wherein the dynamic content comprises an indication of time.

10. The system as recited in claim 1 wherein the dynamic content comprises a battery charge indicator.

11. The system as recited in claim 1 wherein the dynamic content comprises biometric data.

12. The system as recited in claim 1 wherein the display controller is configured to display the plurality of prerendered frames according to time stamps associated with the plurality of prerendered frames.

13. The system as recited in claim 1 wherein the display controller is configured to power down responsive to completing display of the given frame and modifying the next frame.

14. An integrated circuit comprising:
one or more processors forming central processing units (CPUs);
a display controller configured to read frames from a memory and process the frames for display on a display device, wherein the display controller includes a second processor configured to execute instructions;
a memory controller configured to interface to memory on behalf of the one or more processors and the display controller;
interconnect coupled to the one or more processors, the display controller, and the memory controller; and
a power management circuit coupled to the one or more processors, the display controller, the memory controller, and the interconnect, wherein the power management circuit is configured to establish one of a plurality of power states in the integrated circuit, and wherein, in a first power state of the plurality of power states the display controller, the memory controller, and at least a portion of the interconnect between the memory controller and the display controller are powered up while the one or more processors are powered down, and wherein, in the first power state:
the display controller is configured to display a plurality of prerendered frames on the display device, wherein the plurality of prerendered frames are stored in the memory controlled by the memory controller, wherein the display controller is configured to read a given frame of the plurality of prerendered frames over the interconnect from the memory controller and to display the given frame, and wherein the second processor is configured to execute instructions to modify a next frame of the plurality of prerendered frames based on one or more dynamic content locations identified for the next frame.

15. The integrated circuit as recited in claim 14 wherein a plurality of prerendered images representing respective potential dynamic content are stored in the memory, wherein the second processor is configured to select a selected prerendered image of the plurality of prerendered images and composite the selected prerendered image into a corresponding dynamic content location of the one or more dynamic content locations in the next frame.

16. The integrated circuit as recited in claim 14 wherein the power management circuit is configured to power down the display controller responsive to the display controller completing display of the given frame and modifying the next frame.

17. The integrated circuit as recited in claim 16 wherein the power management circuit is configured to power up the display controller to display the given frame.

18. A method comprising:
powering a display controller and a memory controller in a system on a chip (SOC) in a first power state of a plurality of power states for the SOC, wherein one or more processors forming central processing units (CPUs) in the SOC are powered down in the first power state;
reading a given frame of a plurality of prerendered frames from a memory controlled by the memory controller by the display controller in the first power state;
displaying the given frame by the display controller on a display in the first power state; and
modifying a next frame of the plurality of prerendered frames based on one or more dynamic content locations identified for the next frame.

19. The method as recited in claim 18 further comprising:
storing a plurality of prerendered images representing respective potential dynamic content in the memory;
selecting a selected prerendered image of the plurality of prerendered images; and
compositing the selected prerendered image into a corresponding dynamic content location of the one or more dynamic content locations in the next frame.

20. The method as recited in claim 18 further comprising:
powering down the display controller responsive to the display controller completing display of the given frame and modifying the next frame; and
powering up the display controller to display the given frame.

* * * * *